United States Patent
Dutton

(10) Patent No.: US 6,883,105 B2
(45) Date of Patent: Apr. 19, 2005

(54) METHOD AND APPARATUS FOR CONFIGURATION CONTROL AND POWER MANAGEMENT THROUGH SPECIAL SIGNALING

(75) Inventor: Drew J. Dutton, Austin, TX (US)

(73) Assignee: Standard Microsystems Corporation, Hauppauge, NY (US)

( * ) Notice: Subject to any disclaimer, the term of this patent is extended or adjusted under 35 U.S.C. 154(b) by 573 days.

(21) Appl. No.: 10/004,390

(22) Filed: Oct. 25, 2001

(65) Prior Publication Data

US 2003/0084354 A1 May 1, 2003

(51) Int. Cl.⁷ ................................................. G06F 1/26
(52) U.S. Cl. ...................... 713/323; 713/301; 713/302; 713/320; 713/324
(58) Field of Search .................................. 713/323, 501

(56) References Cited

U.S. PATENT DOCUMENTS

| | | | |
|---|---|---|---|
| 4,507,761 A | * | 3/1985 | Graham ....................... 365/233 |
| 5,719,524 A | * | 2/1998 | Mo et al. ..................... 327/545 |
| 6,141,221 A | | 10/2000 | Tong et al. |
| 6,212,590 B1 | | 4/2001 | Melo et al. |
| 6,460,143 B1 | | 10/2002 | Howard et al. |

* cited by examiner

Primary Examiner—A. Elamin
(74) Attorney, Agent, or Firm—Meyertons Hood Kivlin Kowert & Goetzel, P.C.; Jeffrey C. Hood; Erik A. Heter

(57) ABSTRACT

A method and apparatus for configuration control and power management through special signaling is provided. In one embodiment, a computer system may include a processor and a plurality of devices that may act as a source device, a destination device, or both. A particular source device may be configured for communications with a destination device. The source device may further be configured to violate one or more known communications rules when communicating the with the destination device. The destination device may be configured to detect the violation. The violation of a known communications rule by the source device may indicate a pending change of state in the computer system, or that a change of state has occurred.

25 Claims, 3 Drawing Sheets

METHOD AND APPARATUS FOR CONFIGURATION CONTROL AND POWER MANAGEMENT THROUGH SPECIAL SIGNALING

BACKGROUND OF THE INVENTION

1. Field of the Invention

This invention relates to computer systems, and more particularly, to power management and configuration control.

2. Description of the Related Art

As computer technology advances, the demand for more functionality in computer systems increases. The demand for additional functionality often times requires an increase in required signals in order to implement the new functions. The need for additional signal space may often times result in higher pin counts on the various chips on both the computer system motherboard as well as within the various peripheral devices (e.g CD-ROM players, etc.). The increased pin counts can become a significant cost factor at both the chip level and the system level.

In addition to the demand for increased functionality, there is an increasing demand for configuration and power management functions to be built into computer systems. With the advent of technologies such as plug-and-play, as well as new bus types, such as Universal Serial Bus, there are more compatibility demands on computer systems. Often times, these demands may require additional pins to be added to the various system chips that support these functions.

As previously noted, increased pin counts can become a significant cost factor in computer systems. At both the chip level and the system level, higher pin counts may result in increased material and manufacturing costs. Furthermore, at the system level, higher pin counts may result in additional signal routing requirements, which can lead to design problems and additional costs. At times, the additional pin count requirements may make the cost of implementing new functionality too high, and thus, some functions may not be implemented in a given computer system.

SUMMARY OF THE INVENTION

A method and apparatus for configuration control and power management through special signaling is provided. In one embodiment, a computer system may include a processor and a plurality of devices that may act as a source device, a destination device, or both. For example, a particular source device may be configured for communications with a destination device. Two or more of the devices may have pins that are defined for various pre-configured functions. One embodiment of the invention operates wherein a source device may be configured to violate one or more known communications rules when communicating with the destination device. The destination device may be configured to detect the violation. The violation of a known communications rule by the source device may be used to indicated or communicate various types of information without the requirement of an additional pin or pins for this purpose. For example, the violation of a known communications rule may indicate a pending change of state in the computer system, or that a change of state has occurred. The violation of a known communications rule may also be used to invoke software in order to re-enumerate attached peripheral devices and functions.

In various embodiments, the violation of a known communications rule by a source device may comprise one or more of several different methods. In one embodiment, the source device may violate a known communications rule (thereby indicating a change of system state) by driving a clock signal to the destination device (including embedded clock signals), wherein the clock signal is outside of a specified frequency range. In another embodiment, the source device may be configured to change the frequency of a clock signal by a specified amount. In yet another embodiment, the source device may violate a known communications rule by transmitting a frequency modulated (FM) signal to the destination device. In another embodiment, the source device may be configured to transmit a signal to the destination device at a voltage level above or below a specified threshold.

The destination device may be configured to detect one or more methods of violating known communications rules. Upon detecting of the violation, the destination device may perform any functions required in accordance with the pending or completed change of state of the computer system, or any required re-enumeration of peripheral devices or functions.

A wide variety of devices may act as source devices, destination devices, or both. In one embodiment, and I/O controller hub may act as a source device and/or a destination device. The I/O controller hub may control I/O transactions between a processor and various peripheral devices that are coupled to the I/O controller hub through one or more peripheral buses. Various peripheral devices may also act as source and/or destination devices. Some peripheral devices may be configured for plug-and-play operations and/or may also be configured for hot-swapping.

The system and method may also be implemented in portable computer systems. In one embodiment, the computer system may include a mobile unit and a docking station. A violation of a known communications rule may occur responsive to a user signal that the mobile unit is about to be undocked from the docking station. Similarly, a violation of a known communications rule may occur responsive to a user connecting the mobile unit to the docking station. The special signaling conducted by the violation of the known communications rule may establish or de-establish a data link between the mobile unit and the docking station. Upon undocking, the special signaling may cause either the mobile unit, the docking station, or both to be powered down or placed in a standby mode. For wireless docking (i.e. no physical connection between the docking station and mobile unit), a violation of a known communications rule may comprise a change in transmitted signal strength for signals transmitted between the mobile unit and the docking station.

The special signaling may have various uses. In addition to the docking station/mobile unit example provided above, the system and method for special signaling may be used for power management in non-portable computer systems. In one embodiment, a computer system may be configured to detect the elapsing of a predetermined time period of inactivity for a peripheral device. Responsive to the inactivity, the computer system may remove power from the peripheral device. Alternatively, the peripheral device may include its own internal timer, and may be configured to remove power from itself after a predetermined period of time has elapsed. Responsive to the elapsing of the predetermined time period, the peripheral device may use special signaling to notify the host computer system that it is powering down. Special signaling may also be used in conjunction with plug-andplay devices and devices that are hot-swappable, and may be used to indicate actions for power management and other operational functions.

Thus, the special signaling provided herein operates to communicate information between devices without requiring additional pins for this purpose. This operates to reduce pin counts in chipsets or device circuitry.

BRIEF DESCRIPTION OF THE DRAWINGS

Other aspects of the invention will become apparent upon reading the following detailed description and upon reference to the accompanying drawings in which.

Figure 1:
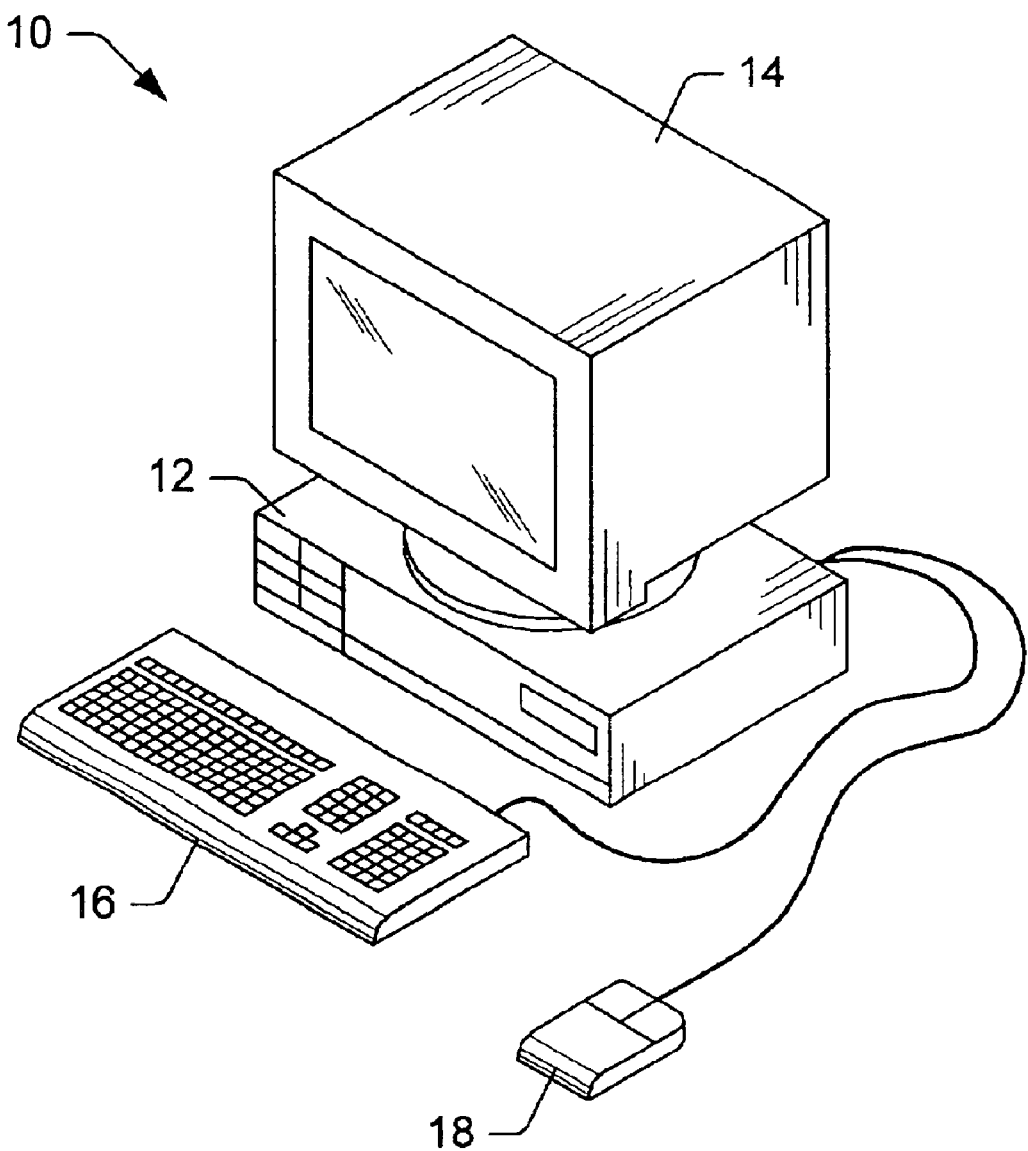
FIG. 1 is a drawing of one embodiment of a computer system.

While the invention is susceptible to various modifications and alternative forms, specific embodiments thereof are shown by way of example in the drawings and will herein be described in detail. It should be understood, however, that the drawings and description thereto are not intended to limit the invention to the particular form disclosed, but, on the contrary, the invention is to cover all modifications, equivalents, and alternatives falling with the spirit and scope of the present invention as defined by the appended claims.

DETAILED DESCRIPTION OF THE INVENTION

Turning now to FIG. 1, a drawing of one embodiment of a computer system is shown. The computer system may be one of several different types that may utilize the system and method of special signaling. The computer system shown may be the basis for computer systems such as desktop personal computers, laptop computers, network computers, internet appliances, and many other devices which may generate and display 2D and/or 3D graphics.

Computer system 10 includes system unit 12 and display device 14, which is coupled to system unit 12. Display device 14 may be one of several different types of displays or monitors (e.g. CRT, LCD, gas-plasma display, etc.). Computer system 10 may also have various input devices coupled to it, such as keyboard 16 and/or mouse 18. Other input devices are possible and contemplated, and may include trackballs, digitizes, tablets, six-degree of freedom input devices, head trackers, eye trackers, data gloves, body sensors, and so on. Computer system 10 may be configured to execute various types of application software, and may display 2D or 3D graphics on display device 14. The application software may be stored in memory, read from a server through a network connection, or may be read from one or more of several different storage devices. Such storage devices may include, but are not limited to, computer diskettes, CD-ROM, DVD-ROM, computer tape, hard disk storage, and flash memory storage.

Figure 2:
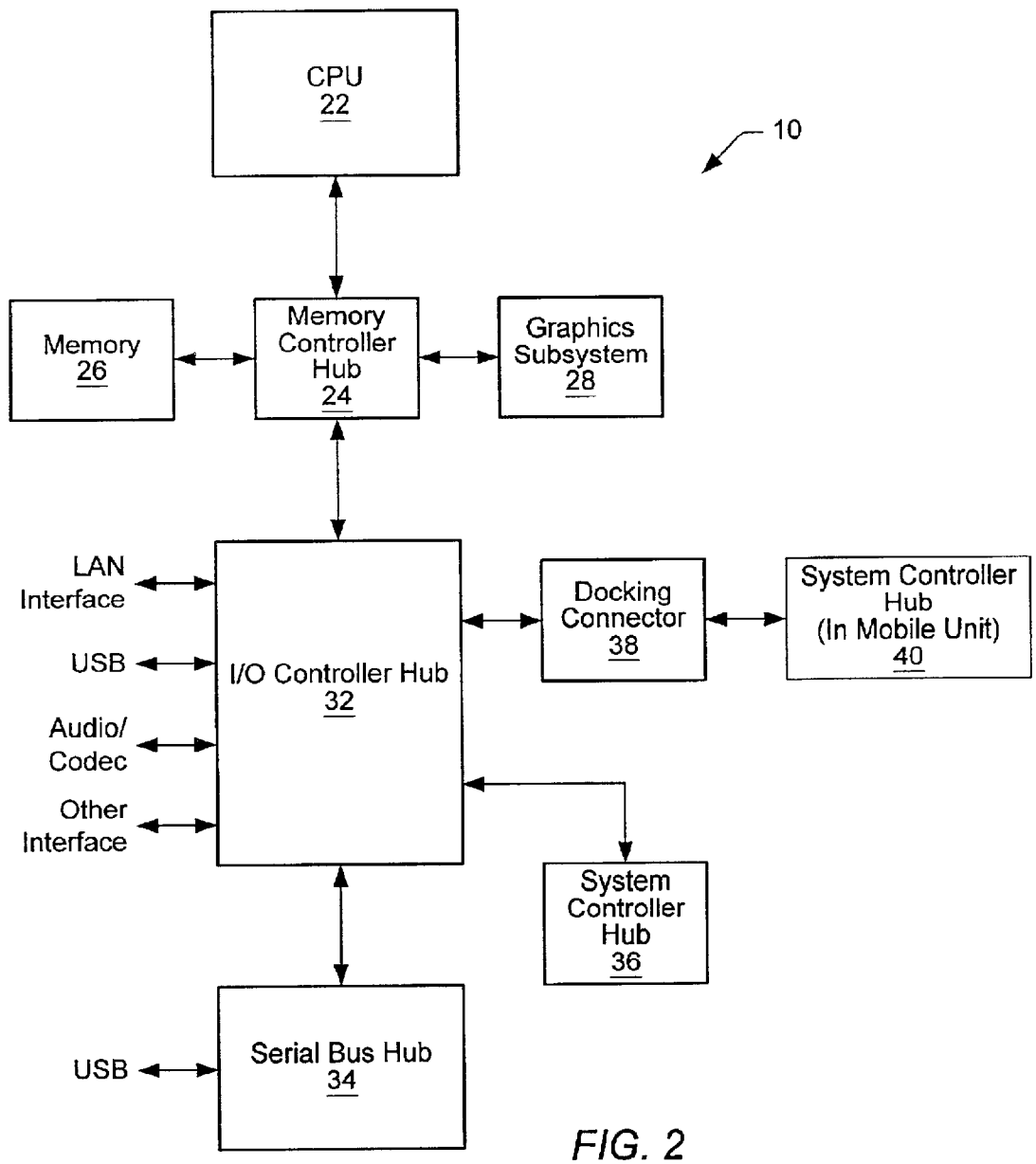
FIG. 2 is a block diagram of one embodiment of a computer system.

FIG. 2 is a block diagram of one embodiment of a computer system, such as the computer system illustrated in FIG. 1. Other embodiments are possible and contemplated. Computer system 10 includes CPU 22, which is coupled to memory controller hub 24. Memory controller hub 24 is coupled to memory 26, graphics subsystem 28, and I/O controller hub 32. I/O controller hub 32 is coupled to serial bus hub 34 and system controller hub 36. Computer system 10 may be configured for docking with a mobile unit, and thus I/O controller hub 32 may be coupled to docking connector 38. Docking connector 38 may be configured to be operatively coupled to a system controller hub 40 of the mobile unit.

CPU 22 may be one of many different types of processors of various architectures. In on embodiment, CPU 22 may be a processor of the x86 architecture. It should be noted that other embodiments of computer system 10 having multiple instances of CPU 22 are possible and contemplated. CPU 22 may access needed data and instructions from memory 26 through memory controller hub 24. Memory 26 may include system memory (e.g. random access memory, RAM) and/or hard storage (e.g. hard disk or diskette). When the results of processor operations require output to a monitor, LCD, or other type of display, memory controller 24 may control the flow of data to graphics subsystem 28.

Many transactions between CPU 22 and one or more peripheral devices may be controlled by I/O controller hub 32. I/O controller hub, in the embodiment shown, is a central I/O controller through which all I/O transactions (with the exception of transactions with the graphics subsystem) are controlled. I/O controller hub 32 may directly interface with various peripheral buses, including a universal serial bus (USB) and an Audio Codec (i.e. AC 97) bus. Interfaces with other types of serial buses are possible and contemplated, as are interfaces with the various types of parallel buses (e.g. peripheral component interface, or PCI). I/O controller hub 32 may also be configured for interfacing computer system 10 to a local area network (LAN).

In addition to interfacing directly with peripheral buses and devices, I/O controller hub 32 may also interface with other I/O controllers, such as serial bus hub 34 and system controller hub 36. Serial bus hub 34 may be configured for interfacing with various types of serial buses, including the USB interface shown. Serial bus hub 34 may allow for additional serial buses to be implemented in computer system 10, or may allow for the direct control of serial bus operations to be shifted away from I/O controller hub 32.

System controller hub 36 may be used for interfacing to various system devices, such as a mouse, a keyboard, a trackball, or other input device. It should be noted that in some embodiments, I/O controller hub 32 may provide these functions. System controller hub 36 may also provide an interface for various output devices, such as speakers or a sound card. System controller hub 36 may also be used to interface various peripheral buses as necessary.

As noted above, computer system 10 may include a mobile unit. Docking connector 38 may allow for the coupling of the mobile unit to computer system 10. Docking connector 38 may couple a system controller hub 40 of the mobile unit to I/O controller hub 32. The mobile unit in which system controller hub 40 is implemented may be one of several different types of devices, including laptop computer systems and personal digital assistants (PDAs).

Figure 3:
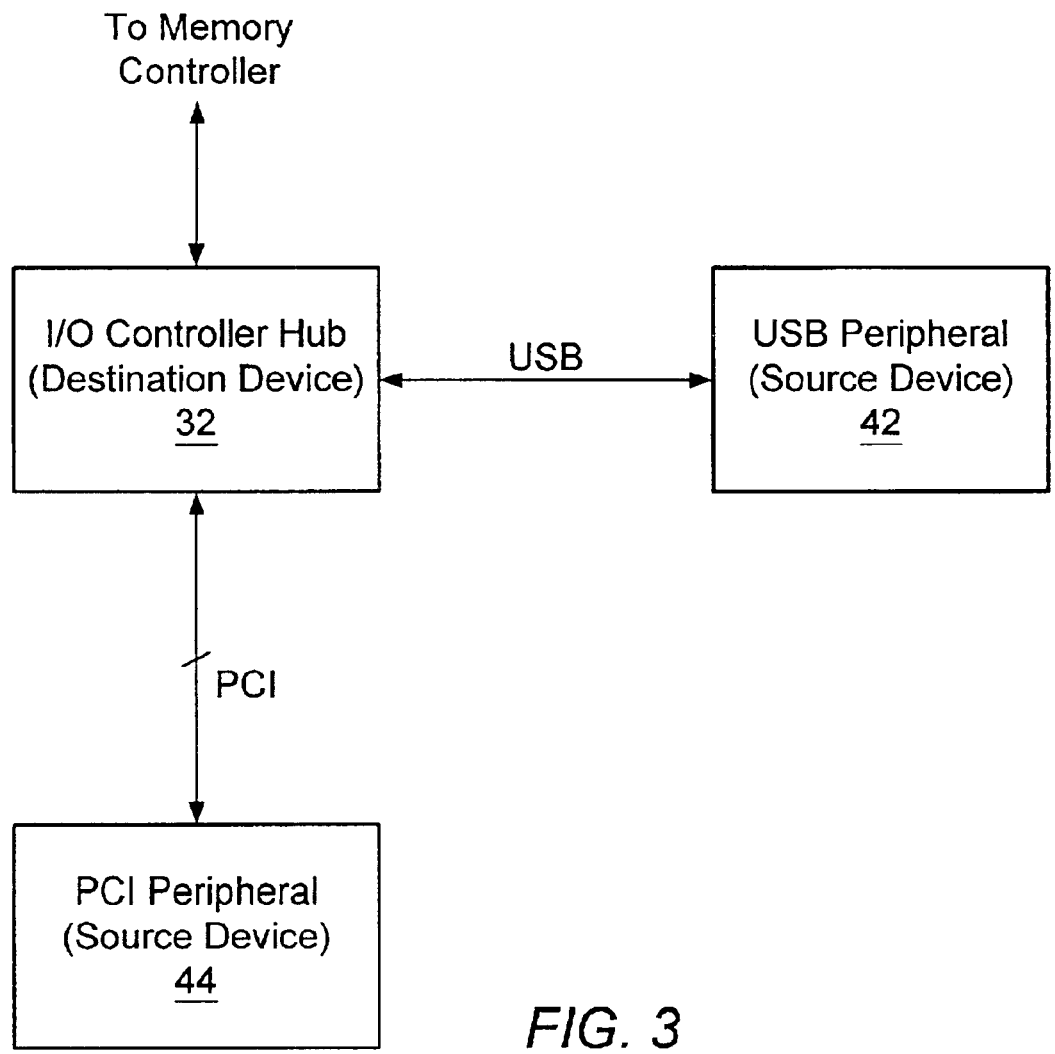
FIG. 3 is a block diagram illustrating source devices and a destination device.

Moving now to FIG. 3, a block diagram illustrating source devices and a destination device is shown. In this embodiment, I/O controller 32 is coupled to USB peripheral 42 by a universal serial bus, and is coupled to PCI peripheral 44 by a PCI bus, which is a parallel bus. USB peripheral 42 and PCI peripheral 44 may be virtually any type of peripheral devices that are configured to function with their respective buses. It should also be noted that various embodiments of I/O controller 32 may be configured to support other types of buses as well, and that other types of peripheral devices may be coupled to it through these buses.

In the embodiment shown, I/O controller hub 32 acts as a destination device, while USB peripheral 42 and PCI peripheral 44 act as source devices. It should be noted that USB peripheral 42 and PCI peripheral 44 may also act as destination devices in some embodiments. Similarly, it should be noted that I/O controller 32 may act as a source device. In general, devices may act as source devices, destination devices, or both, as required by the needs of the particular system in which they are implemented.

Each of the source devices may be configured to indicate a change of state of the system to the destination device by violating a known communications rule. The indication may inform the destination device that a change of state has already occurred. For example, if the source device is a plug-and-play device that has just completed initialization and is ready for normal operations, it may use the special signaling method of violating a known communications rule in order to indicate to its host system that it is ready for normal operations. The indication may also be used by the source device to indicate a pending change of state to the system. For example, a peripheral device which has been inactive for a specified time period may indicate to a host system that it is about to power itself down by violating a known communications rule.

The violation of a known communications rule in order to indicate a change of state of the system may allow various devices to be implemented without adding to pre-existing pin-counts. For example, the standard pin counts for USB and PCI are set by industry standards. New devices that require the use of special signaling may be implemented on these buses without adding additional pins in order to perform the special signaling.

As previously noted, the special signaling is performed by violating a known communications rule between the source and the destination device. One of several different methods may be used for the special signaling. Some devices may be configured to perform or detect more than one of the special signaling methods.

Several of the special signaling methods may involve a phase-locked loop (PLL). One method of special signaling involves the source device driving a clock signal to the destination device, wherein the clock signal is outside of a specified frequency range. Since the frequency range of the clock signal is specified, transmitting a clock signal outside of this range may be a violation of a known communications rule. The frequency of the clock signal may be above or below the specified frequency range. A PLL at the source may be configured to perform the driving of the clock signal. A second PLL at the destination may be configured to detect the clock signal that is outside of the specified frequency range. The detection of the clock signal outside of the specified frequency range may indicate a change of state of the system.

Another method of special signaling may comprise the source device changing the clock frequency by a specified amount. The PLL of the destination device may then detect the changing of the clock frequency by a specified amount. The changing of the clock frequency may violate a known communications rule. The detection by the PLL in the destination device may indicate a change of state in the system.

The transmission of frequency modulated (FM) signals from the source device to the destination device may be another method employed for special signaling. The destination device may be configured to detect the FM signal driven by the source device. Since many devices may only be configured for digital data transmissions, the driving of an FM signal from the source device to the destination device may violate a known communications rule.

Many digital devices perform data transfers according to specified protocols and standard encoding. The standard encoding may involve a combination of data signals and clock signals. A source device may violate a known communications rule by transmitting a combination of data signals and clock signals which are in violation of the standard encoding. The destination device, upon detecting the transmission of data and clock signals may determine that the transmission is in violation of the standard encoding, thus indicating a change of state of the system.

Some pins on digital devices may be dedicated input pins or output pins. Typically, input pins are used by a device for receiving signals, while output pins are used by a device only for transmitting signals. Another method of special signaling may involve transmitting signals from the input pins of a source device to pins on a destination device. The pins on the destination device that receive the transmission may be output pins, input pins, or both. The destination device may be configured to detect the driving of signals from the input pins of the source device, and thus may receive an indication of a change of state of the system.

It should be noted that some embodiments may be configured to utilize more than one of the methods described above. The utilization of multiple methods may enable a source device to indicate a cause for the change of state of the system. For example, a plug and play device with power management functions may be configured to transmit a clock signal from a source device to a destination device in a host computer system to indicate that it is in the system and has been initialized. The plug and play device may also be configured to transmit an FM signal from a source device to a destination device in the host computer system if it has been inactive for a specified period of time, and thus is about to power itself down.

Similarly, the various methods of special signaling may be used to implement various commands. For example, a host computer system may command a peripheral device to power itself down using a specific one of the special signaling methods discussed above, or may command it to bring itself out of an idle state using another one of the special signaling methods.

While the present invention has been described with reference to particular embodiments, it will be understood that the embodiments are illustrative and that the invention scope is not so limited. Any variations, modifications, additions, and improvements to the embodiments described are possible. These variations, modifications, additions, and improvements may fall within the scope of the inventions as detailed within the following claims.

What is claimed is:

1. A system comprising:

a source device;

a destination device coupled to the source device;

wherein the source device is configured to violate a known communications rule, and wherein the destination device is configured to detect said violating a known communications rule, and wherein the destination device includes a phase locked loop (PLL);

wherein said violating a known communications rule indicates to the destination device a change in the state of the system, and wherein said violating comprises the source device driving a clock signal to the destination device at a frequency that is outside of a specified frequency range, and wherein the PLL is configured to detect said driving a clock signal outside of the specified frequency range.

2. The system as recited in claim 1, wherein said violating indicates a command from the source device to the destination device to change the state of the system.

3. The system as recited in claim 1, wherein said violating provides an indication from the source device to the destination device that a change in the state of the system has occurred.

4. The system as recited in claim 1, wherein said violating comprises driving signals from an input pin of the source device, and wherein the destination device is configured to detect said driving.

5. The system as recited in claim 1, wherein the system is a computer system, the computer system comprising:
a processor;
an input/output (I/O) controller coupled to the processor;
a peripheral bus coupled to the I/O controller; and
at least one peripheral device coupled to the peripheral bus.

6. The system as recited in claim 5, wherein the computer system comprises a docking station and a mobile unit.

7. The system as recited in claim 6, wherein said violating indicates that the mobile unit is to be undocked from the docking station.

8. The system as recited in claim 5, wherein the peripheral device is a plug-and-play peripheral device.

9. The system as recited in claim 8, wherein said violating indicates that the peripheral device is to be removed from the system.

10. The system as recited in claim 8, wherein said violating indicates that the peripheral device has been inserted into the system.

11. The system as recited in claim 5, wherein said violating indicates that the peripheral device has been inactive for a predetermined period of time.

12. A method comprising:
a source device communicating with a destination device;
the source device violating a known communications rule;
the destination device detecting said violating, wherein said detecting indicates to the destination device a change of state of a system comprising the source device and the destination device, and
detecting said violating with a phase-locked loop (PLL), wherein the PLL is comprised by the destination device, wherein said violating comprises the source device driving a clock signal to the destination device at a frequency that is outside of a specified frequency range, and wherein the PLL is configured to detect said driving a clock signal outside of the specified frequency range.

13. The method as recited in claim 12, wherein said violating indicates a command from the source device to the destination device to change the state of the system.

14. The method as recited in claim 12, wherein said violating provides an indication from the source device to the destination device that a change in the state of the system has occurred.

15. The method as recited in claim 12, wherein said violating comprises driving signals from an input pin of the source device, wherein the destination device is configured to detect said driving.

16. The method as recited in claim 12, wherein the system comprising the source device and the destination device is a computer system, the computer system comprising:

a processor;
an input/output (I/O) controller coupled to the processor;
a peripheral bus coupled to the I/O controller; and
at least on peripheral device coupled to the peripheral bus.

17. The method as recited in claim 16, wherein the computer system comprises a docking station and a mobile unit.

18. The method as recited in claim 17, wherein said violating indicates that the mobile unit is to be undocked from the docking station.

19. The method as recited in claim 16, wherein the peripheral device is a plug-and-play peripheral device.

20. The method as recited in claim 19, wherein said violating indicates that the peripheral device is to be removed from the system.

21. The method as recited in claim 19, wherein said violating indicates that the peripheral device has been inserted into the system.

22. The method as recited in claim 16, wherein said violating indicates that the peripheral device has been inactive for a predetermined period of time.

23. A system comprising:
a source device;
a destination device coupled to the source device;
wherein the source device is configured to violate a known communications rule, and wherein the destination device is configured to detect said violating a known communications rule, and wherein the destination device includes a phase locked loop (PLL);
wherein said violating comprises the source device changing the frequency of a clock signal by a specified amount, wherein the PLL is configured to detect said violating by detecting said changing the frequency.

24. A system comprising
a source device;
a destination device coupled to the source device;
wherein the source device is configured to violate a known communications rule, and wherein the destination device is configured to detect said violating a known communications rule, and wherein the destination device includes a phase locked loop (PLL), and wherein said violating comprises the source device transmitting a frequency modulated signal to the destination device, and wherein the destination device is configured to detect the frequency modulated signal.

25. A system comprising:
a source device;
a destination device coupled to the source device;
wherein the source device is configured to violate a known communications rule, and wherein the destination device is configured to detect said violating a known communications rule;
wherein said violating a known communications rule indicates to the destination device a change in the state of the system, and wherein said violating comprises the source device transmitting a combination of clock signals and data signals to the destination device, wherein the combination is in violation of a standard encoding.

* * * * *